United States Patent [19]

Keepers

[11] 4,257,654
[45] Mar. 24, 1981

[54] FILAMENT WOUND BEARING
[75] Inventor: Hugh E. Keepers, Farmers Branch, Tex.
[73] Assignee: Varel Manufacturing Company, Dallas, Tex.
[21] Appl. No.: 5,396
[22] Filed: Jan. 22, 1979
[51] Int. Cl.³ .............................................. F16C 17/12
[52] U.S. Cl. ..................................... 308/8.2; 308/241; 308/DIG. 5
[58] Field of Search ................... 308/8.2, DIG. 8, 234, 308/DIG. 9, 241, DIG. 5, 239; 175/371; 277/230, 96.2, 235, 233; 29/149.5 PM

[56] References Cited
PUBLICATIONS

Facet *Poroloy* pamphlet (prior art–no date).

*Primary Examiner*—Lenard A. Footland

[57] ABSTRACT

A filament wound bearing infiltrated with an antigalling material is constructed by winding a filament (42) on a mandrel (46) to form a crisscrossed pattern of a bearing structure (40). The bearing structure (40) is diffusion bonded in a furnace (58) and subsequently densified between mandrels (66, 68). Following densification, the bearing structure (40) is again diffusion bonded in the furnace (58) to provide flat wound strips bonded together to form a load supporting core. This core is placed in a crucible filled with an infiltrate antigalling material and heated in a vacuum atmosphere in the furnace (58) to cause the infiltrate to fill the pores of the bearing structure (40) by means of capillary action. The final bearing structure comprises a crisscross pattern of flattened filaments bonded together at crossover points where the pore size and pore spacing are controlled to provide a desired density. The porous areas of the crisscross pattern are filled with an antigalling material to provide improved bearing performance.

7 Claims, 8 Drawing Figures

# FILAMENT WOUND BEARING

TECHNICAL FIELD

This invention relates to bearing structure, and more particularly to a filament wound bearing infiltrated with an antigalling material for improved bearing characteristics.

BACKGROUND ART

Heretofore, bearings infiltrated with an antigalling material were made from a base of an alloy powder compressed into the shape of the desired bearing element thereby providing a porous matrix. The porous matrix was sintered and the antigalling material infiltrated into the porous structure. Usually the infiltrated antigalling material was a copper or copper zinc alloy and in at least one such bearing structure the infiltrated material was silver. To overcome the considerable increase in the amount of friction to a rotating or sliding part when using infiltrated bearing structures, a reinfiltration of the bearing structure with antimony is employed to provide a harder surface. Other attempts to provide improved infiltrated bearing structures utilized Tungsten carbide particles in a high, temperature resistant, metal matrix.

In addition to the infiltration of a matrix with an antigalling material into a bearing structure, there have also been previous attempts to construct bearings juxtapositioned surfaces of wear resistant and antigalling materials. Grooves in the surface of the bearing structure were filled with a soft metal having antigalling characteristics. There is, however, the problem of smearing of the antigalling material over a bearing surface when loads are impressed upon the bearing structure. This negated the beneficial effects of the antigalling material and produced an unsatisfactory bearing structure.

DISCLOSURE OF THE INVENTION

A bearing structure in accordance with the present invention includes the infiltration of an antigalling material into a wound core matrix. The core matrix is wound from a continous filament in a crisscrossed multilayered configuration to form a porous body. Pore size, pore spacing and permeability of the body may be varied by wire size selection, winding spacing and the number of crisscrossed layers. The density of the material is variable by rolling the body under a given pressure on a mandrel in a process for manufacturing the bearing structures of the present invention. The antigalling material infiltrated into the body structure includes any number of differing alloys and materials in addition to metallic and/or organic compositions.

Although bearing structures of the present invention find extensive use in rotary rock bits, and the following description of the invention relates to rock bits, bearing structures as described are also useful as thrust bearings and in bearing configurations that include cylindrical, flat washer and disc forms.

When utilized in a rotary rock bit the bearing structure of the present invention provides longer useful lifetimes for the bit. This improved performance is desirable since any extension of the useful life of the rotary bit results in a reduction of the number of times the drill string must be withdrawn to replace a failed bit.

In accordance with the present invention, a wound filament bearing comprises a crisscrossed, multilayered porous, wire body wound into a selected configuration. Infiltrated into the porous areas of the body is an antigalling material with the antigalling material partially filling the porous areas.

A bearing structure as described above is formed by first winding a filament into a porous multilayered, crisscrossed pattern of the desired configuration. Next, the filament pattern is densified by any one of several techniques to establish a desired pore density. Following densification the crossover areas of the crisscrossed pattern are bonded together. Next, the porous areas of the multilayered, crisscrossed pattern are infiltrated with the antigalling material.

DESCRIPTION OF DRAWINGS

For a more complete understanding of the invention and its advantages, reference may now be had to the following description taken in conjunction with the accompanying drawings.

Referring to the drawings.

DESCRIPTION OF PREFERRED EMBODIMENT

Figure 1:
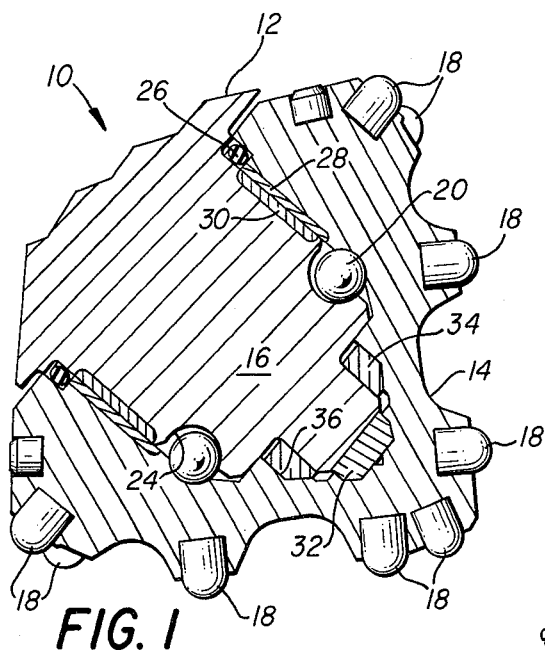
FIG. 1 is a sectional view showing one cutter of a rotary cone rock bit including the bearing journal upon which a cone rotates with the bearing structure of the present invention between the cone inner surface and the journal surface.
Figure 2:
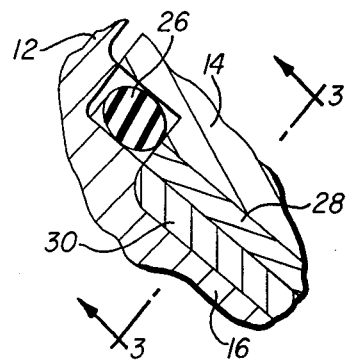
FIG. 2 is an enlarged sectional detail of the bearing structure of the present invention.

Referring to the drawings, FIG. 1 shows one cone, which is generally designated by the reference numeral 10, of a conventional three cone rotary rock bit. The bit body includes three substantially identical arms with one of the arms 12 partially illustrated in the figure. A rotary cone cutter 14 is rotatably positioned on a bearing pin 16 extending from the arm 12. The rotary cone cutter 14 includes customary metal inserts 18, as indicated, on its outer surface adapted to disintegrate the formations as the bit is rotated utilizing conventional drilling techniques. The metal inserts 18 are conventional and usually formed from Tungsten carbide although it is not uncommon that such metal inserts may be of a hardened steel.

While not shown in FIG. 1, the bit body 12 and the bearing pin 16 are provided with a passageway through which ball bearings 20 are inserted to a ball race 22 in the cutter 14 and a complementary race 24 in the bearing pin. Although not necessarily required, many rotary rock bits are provided with a lubricating system to provide a lubricant in the areas of the ball bearings 20 and other bearing surfaces between the rotary cone 14 and the bearing pin 16. Escape of lubricant from the bearing area within the cone and the prevention of entry of cuttings and other foreign materials from the outside is sealed off by a suitable seal, such as the O-ring 26, again all in a conventional arrangement.

Positioned in the inner surface of the cutter 14 is a main bearing 28, which may be a free floating bearing, and positioned on the outer surface of the bearing pin 16 in mating contact with the bearing 28 is a hardened bearing surface 30. The hardened bearing surface 30 may be provided by welding and subsequent machining or by a ring insert pressed over the outer surface of the bearing pin 16. At the lower end of the journal 12 there is positioned in a cavity of the cutter 14 a thrust button 32 provided to resist the thrust forces generated between the end of the bearing pin 16 and the cone 14. Also provided on the bearing pin 16 is a pilot bearing 34 that is press fit into a cavity 36 of the cutter 14.

In accordance with the present invention, the main bearing 28, the thrust button 32, and the pilot bearing 34 are all provided with hardened wear resistant bearing surfaces formed from a porous body and impregnated with a self-lubricant of an antigalling material. By use of a bearing surface as will be described the useful lifetime of these bearings is extended, thereby extending the useful lifetime of the complete bit.

Each of the bearings 28, 32 and 34 has improved wearing qualities when constructed from a filament that is wound with crossover sections that are diffusion bonded where porous areas are infiltrated with an antigalling material in accordance with the present invention. Although each of these bearing structures may be constructed from a wound filament the invention will be described with reference to the main bearing 28 having a cylindrical configuration, it being understood that the steps of the process to be described are equally applicable to the construction of bearings having a disc configuration.

To provide a wound filament bearing in accordance with the present invention there are four processing steps including winding, diffusion bonding, infiltrating, and heat treating. Each of these steps may consist of one or more subroutines.

Figure 4:
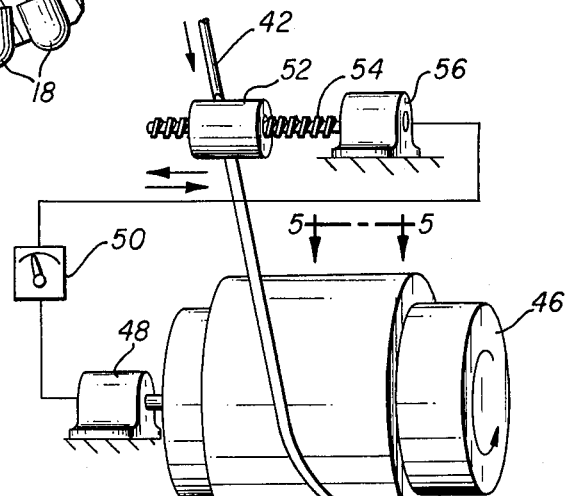
FIG. 4 schematically illustrates the winding step of the process of producing a bearing structure.
Figure 3:
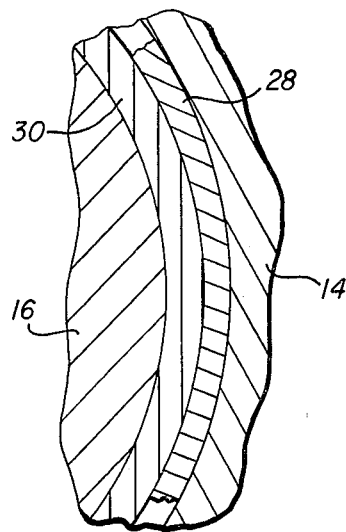
FIG. 3 is an enlarged section taken along the line 3—3 of FIG. 2.
Figure 5:
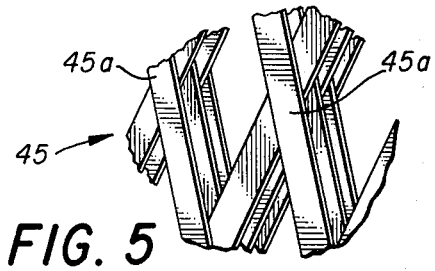
FIG. 5 is an enlarged view of the crisscrossed multilayered porous pattern produced by the winding step of FIG. 4.

Referring to FIG. 4, there is shown apparatus for carrying out the first step, that is, winding a wire filament into a desired bearing structure configuration. The bearing structure 40 is formed by winding a fine wire filament 42 onto a mandrel 46 in a crisscross pattern 45, as shown in FIG. 5. The mandrel 46 is driven by a motor 48 connected to a controller 50 that controls rotational speed of the mandrel and the number of layers used to build up the bearing structure 40.

Prior to winding the wire filament 42 on the mandrel 46 it is flattened into a ribbon by means of a press roller 52 which also acts as a guide for directing the filament onto the mandrel 46 to develop the crisscross multilayered pattern 45 as shown in FIG. 5. The press roller 52 is positioned by means of a lead screw 54 driven by a motor 56 which is also coupled to the controller 50. The speed of the motor 56 is adjusted to the speed of the motor 48 to provide the desired crisscross pattern which in turn determines the pore size of the bearing structure 40. Thus, wire size, winding spacing and the number of layers of the bearing structure 40 are controlled to provide the desired pore size, pore spacing and permeability of the bearing structure. Typically, pore size and pore spacing are controlled so that the inside diameter and outside diameter of the bearing structure 40 have a fifteen percent (15%) density while the density of the supporting core may be as high as 87%. With regard to porosity of the bearing structure 40, which is a function of wire size and winding spacing, any given porosity (within a specific wire size) can be controlled from one layer to the next by means of the controller 50.

To construct a disc-shaped bearing, such as the thrust button 32, the cylindrical bearing structure 40 is split and then flattened. The washer or disc shape is then cut from the flattened section of the bearing structure 40. Subsequent processing of such bearing configurations is similar to that to be described with reference to the cylindrical bearing structure 40 of FIG. 4.

Figure 6:
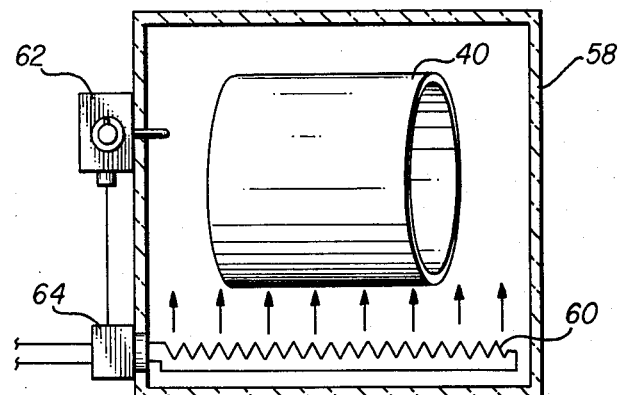
FIGS. 6-8 illustrate additional steps in the process of manufacturing bearing structure from the crisscrossed pattern of FIG. 5.

Referring to FIG. 6, following the step of winding the bearing structure 40 into the desired configuration, it is removed from the mandrel 46 and placed in a furnace 58 that is equipped with a resistance heater 60 and connected to a vacuum or hydrogen source by means of a controller 62. The controller 62 also connects to a switch 64 for controlling power to the resistance heater 60. Thus, by means of the controller 62 both the atmosphere and temperature within the furnace 58 are controlled. The temperature is controlled to be compatible with the material of the wire filament 42 which may be any desired alloy, for example, Stellite 190, BeCu, 4815, or 400 SST as representative examples. The temperature within the furnace 58 is raised to a point where the crossover points 45a of the flattened filament, see FIG. 5, are diffusion bonded.

Figure 7:
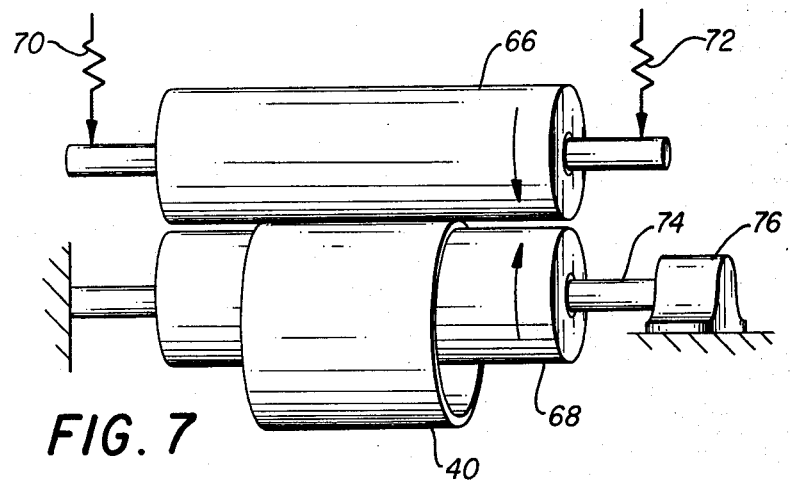

Referring to FIG. 7, following diffusion bonding the final density of the bearing structure 40 is achieved by rolling between mandrels 66 and 68. A desired pressure is developed on the bearing structure 40 by means of adjustments 70 and 72, shown schematically in FIG. 7. The mandrel 68 is rotated on a shaft 74 by means of a motor 76 that rotates at a controlled speed for developing the desired densification of the bearing structure 40. The bearing structure 40 is rotated on the mandrel 68 until a desired density is achieved at the pressure applied to the mandrel 66 by means of the adjustments 70 and 72.

In addition to densification by means of pressure on mandrels 66 and 68, the desired densification of the structure may also be achieved by rotary swagging or roller burnishing or a combination of these three processes.

Returning to FIG. 6, following densification by the step of FIG. 7 the bearing structure 40 is again returned to the furnace 58 for a second diffusion bonding step to further expand the bonded areas, that is, the crossover areas 45a as shown in FIG. 5. Upon completion of the second diffusion in the furnace 58 the resulting structure is composed of flat wound strips bonded together in a form to provide a load supporting core. The bearing structure 40 is now ready for infiltration with an antigalling material.

Infiltration of an antigalling material into the bearing structure 40 may be accomplished by a number of different techniques; however, the most direct method consists of placing the filament wound structure in a crucible along with the antigalling material to be infiltrated. The crucible and its contents are then placed in a furnace, the temperature is raised to a value above the liquid point of the antigalling material and a vacuum is applied to the furnace. When the infiltrated antigalling material is in a liquid state, capillary action draws the infiltrate to fill the pores of the bearing structure 40.

Figure 8:
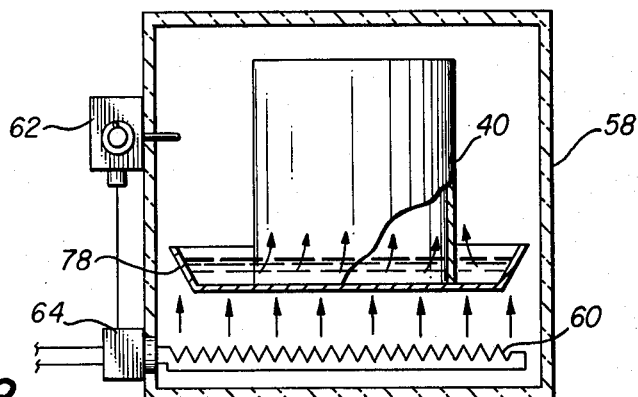

Referring to FIG. 8, there is shown the furnace 58 for carrying out the step of infiltrating the bearing structure 40 with an antigalling material. The bearing structure 40 is placed in a crucible 78 filled with the infiltrate material. The switch 64 is closed to apply power to the resistance heater 60 and the temperature within the furnace 58 is raised to a level above the melting point of the infiltrate material. At the same time, the controller 62 opens the interior of the furnace 58 to a source of vacuum thereby evacuating the furnace.

When the infiltrate antigalling material is in a liquid state in a vacuum atmosphere the pores of the bearing structure 40 are filled by means of capillary action. The capillary action continues until the entire structure has been filled with the infiltrate material and the vacuum is then released and the furnace allowed to cool and the bearing structure is removed. At this point, the bearing structure has the desired load supporting characteristic and is infiltrated with a material to provide improved bearing performance. The physical and chemical properties of the infiltrate in the wound filament bearing structure thus becomes a system designed to operate efficiently on a bearing surface to yield improved performance.

Typically, the infiltrate antigalling material is any one of a number of differing alloys and materials, metallic and/or organic compositions. Examples of infiltrate material include Ampco-trode 300, Ag 85%+Mn 15%, Be+Cu, Teflon+MOS$_2$, as representative examples.

It should be understood that the infiltrate process need not be limited to the vacuum melt method of FIG. 8. Other infiltration processes include injection molding and gas infusion condensation.

Depending on the intended use of the bearing, the infiltrated wound bearing structure may be further heat treated or subject to additional processing, such as machining, to achieve the desired inside diameter and outside diameter dimensions. Such additional processing is not part of the present invention and are steps that are usually required in conventional bearing construction.

While only one embodiment of the invention, together with modifications thereof, has been described in detail herein and shown in the accompanying drawings, it will be evident that various further modifications and changes are possible without departing from the scope of the invention.

I claim:

1. A rotary rock bit with at least one rotary cone cutter having an internal recess receiving a journal pin for mounting said cutter, and a sleeve bearing in the internal recess and engaging an outer surface of the journal pin, said bearing comprising:
   a crosscrossed, multilayered porous, flat wire wound cylindrical body, and
   a nonliquid antigalling material infiltrated into said cylindrical body to substantially fill the porous areas thereof.

2. The sleeve bearing for the rotary rock bit of claim 1 wherein the wire size and winding spacing are selected to control the porosity of the cylindrical body.

3. The sleeve bearing for the rotary rock bit of claim 1 wherein the wire size, winding spacing and number of layers in the cylindrical body are selected to control the pore size and pore spacing of said body.

4. The sleeve bearing for the rotary rock bit of claim 3 wherein the pore size and pore spacing are selected to control the inside and outside surface density and also the density of the supporting core.

5. The sleeve bearing for the rotary rock bit of claim 1 wherein the antigalling material is a metal.

6. The sleeve bearing for the rotary rock bit of claim 1 wherein the antigalling material is an organic composition.

7. The sleeve bearing for the rotary rock bit of claim 1 wherein the antigalling material is a metal alloy.

* * * * *